C. J. JUNGERS.
METHOD OF MAKING WIRE GLASS.
APPLICATION FILED MAY 27, 1909.

1,062,013.

Patented May 20, 1913.

2 SHEETS—SHEET 1.

C. J. JUNGERS.
METHOD OF MAKING WIRE GLASS.
APPLICATION FILED MAY 27, 1909.
1,062,013.
Patented May 20, 1913.
2 SHEETS—SHEET 2.
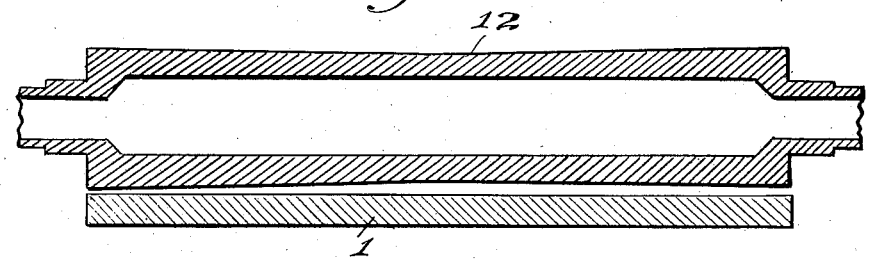
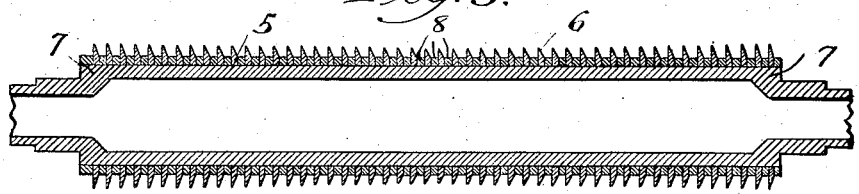
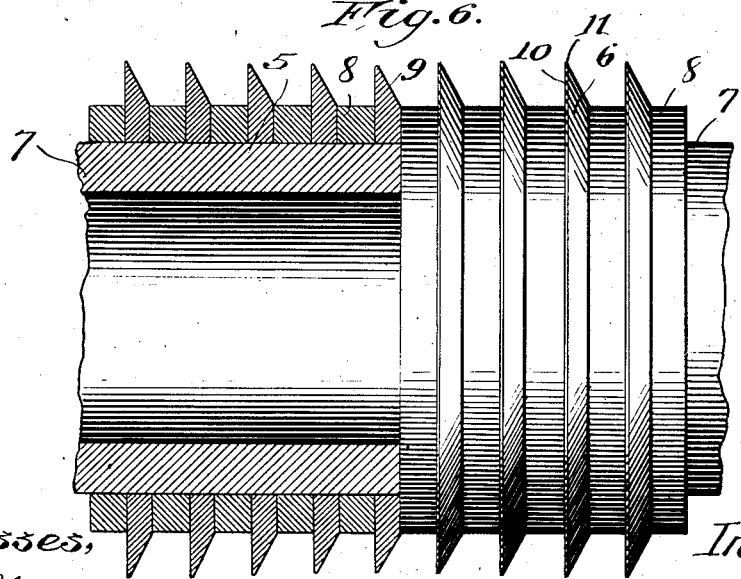

UNITED STATES PATENT OFFICE.

CLEMENT J. JUNGERS, OF STREATOR, ILLINOIS.

METHOD OF MAKING WIRE-GLASS.

1,062,013.   Specification of Letters Patent.   Patented May 20, 1913.

Application filed May 27, 1909. Serial No. 498,648.

*To all whom it may concern:*

Be it known that I, CLEMENT J. JUNGERS, a citizen of the United States, residing at Streator, in the county of Lasalle and State of Illinois, have invented certain new and useful Improvements in Methods of Making Wire-Glass, of which the following is a specification.

This invention relates to an improved method of making wire glass.

Among the main objects of the invention are to provide a process whereby so-called wire glass may be made by a novel single-pour method and whereby a new product will result which will be free from the objectionable characteristics heretofore inherent to wire glass made by any of the single-pour processes heretofore known, and as contra distinguished from such earlier products will be smooth surfaced, clear, brilliant, of uniform undistorted formation, and will have the wire fabric placed therein so accurately and uniformly that the product will be entirely suitable for polishing and for other purposes to which high grade wire glass is adapted; to lessen the operations, the time of operations and the number of persons employed in performing such operations in rolling out the glass, thereby very materially economizing in cost; and to produce an article which while being fully the equal of the best so-called sandwich glass as regards uniformity of structure, clearness, brilliancy, etc., is at the same time made from a single casting or pour of glass rolled out as a single sheet, and therefore possesses greater uniformity of mass throughout than is possible where, as in the sandwich processes, the completed sheet is formed of two separately poured and separately rolled half sheets superposed and welded together.

The invention consists in the matters hereinafter described, and more particularly pointed out in the appended claims.

The invention will be readily understood from the following description, reference being had to the accompanying drawings forming a part thereof, and in which is illustrated suitable and novel apparatus for carrying out the process.

Figure 1:
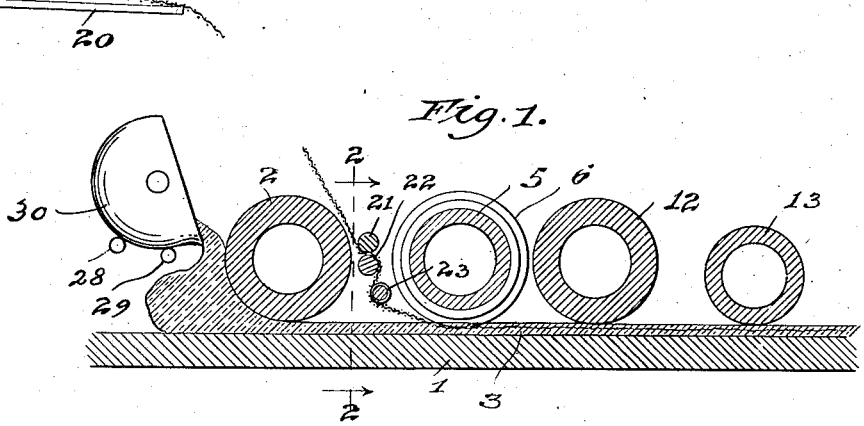
Figure 2:
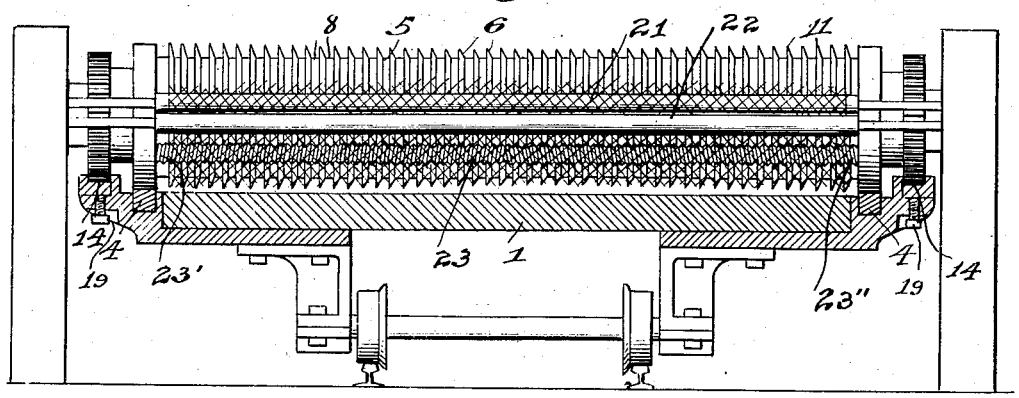
Figure 3:
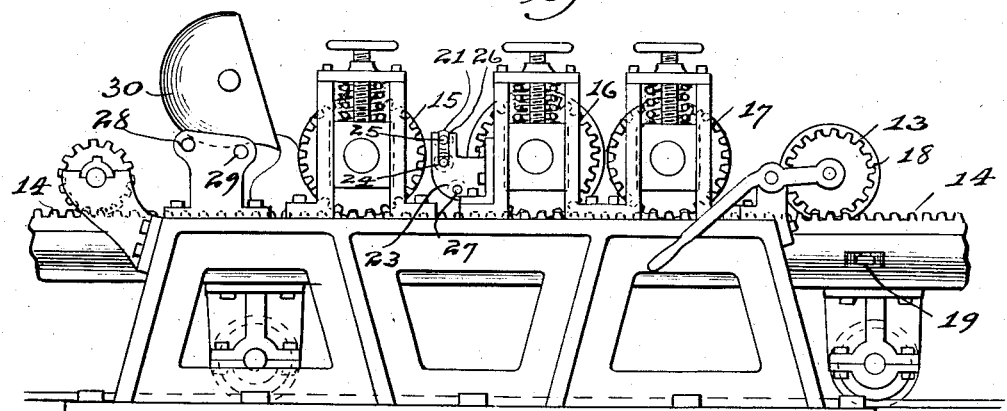

In said drawings—Figure 1 shows in longitudinal vertical section a casting bed, a set of rolls and other accessories for carrying out the process; Fig. 2 is a vertical cross sectional view taken on line 2—2 of Fig. 1 and looking in the direction of the arrows; Fig. 3 is a side elevation of the apparatus shown in section in Fig. 1; Figs. 4 and 5 are longitudinal axial sections of one of the forming rolls and one of the embedding rolls, respectively; the casting bed being also shown in section in Fig. 4; Fig. 6 is an enlarged detail of a portion of the embedding roll, shown partly in axial section and partly in side elevation.

The general method of making wire glass in accordance with the single-pour processes heretofore in use, and the defects inherent in such glass, are set forth with substantial accuracy in Reissue Patent No. 12,443, issued January 30, 1906, to the administrator of E. C. Schmertz, deceased; said description being found immediately following the statement of invention of that patent. The Schmertz reissue referred to also describes one of the so-called sandwich processes of making wire glass as the subject-matter of that reissue. Wire glass of the highest quality is now being largely made substantially in accordance with my previous Letters Patent No. 867,510, dated October 1, 1907; this being also a sandwich process.

In accordance with my present invention I depart from the sandwich process, which is now generally understood as being the only process whereby a polishable glass can be produced, and, reverting back to the single-pour method, have so changed and improved such single-pour method as to produce wire glass not inferior to that which is produced by the best sandwich processes of the present day, and in some respects at least, superior.

Among the difficulties which have prevented the successful making of polishable wire glass by the single-pour process are the following: the distortion of the wire mesh and uneven placing of it in the finished product; the scarring of the top surface by the embedding roll and meshes of the wire, and failure of the following or finishing roll to eliminate these scars; the presence of a serious percentage of bubbles in the finished product; the presence of streaks both of discoloration and of bubbles visible in the finished product; the limitation in size of sheets which it was practicable to make under the old single-pour processes; the presence of ribs defining the shapes of the meshes of wire producing so-called "caramel" glass and interfering with the cutting up of the glass and general lack of uniformity of structure and clearness.

In carrying out my present process, I usually employ an ordinary casting bed or table 1, which is preferably water-cooled, and which bed may be either stationary, with the rolls arranged to travel bodily thereover, or better, the table may be arranged to travel while the rolls are held against bodily traversing movement in a suitable frame in which they are journaled.

I employ a leading roll 2, which is supported at such height above the bed of the table as to spread the glass out into a sheet 3 of approximately the same thickness as the finished sheet. This leading roll may be arranged to travel on tracks 4, or the rolls may be provided with collars or ribs in place of the tracks, which is also a well-known expedient. In either event, the lower periphery of the roll is supported parallel with and above the table at a distance equal to the thickness of the sheet to be made.

One of the important features of the present invention, is to employ such means of rolling out the sheet, of embedding the wire mesh into the sheet and of subsequently smoothing the sheet, that there is no substantial displacement or stirring action of any portion of the sheet after it has once been given its initial form. That is to say, from the instant the sheet emerges from beneath the leading roll, which determines its thickness, its subsequent treatment is such that the sheet is not substantially disturbed, or its constituent parts displaced or tortured; the upper surface of the sheet being, of course, divided both by the embedding flanges which press the wire into the sheet and by the meshes of the wire itself, but such division being effected in such way that the sheet as a whole remains undisturbed and its top surface is only momentarily opened to receive the wire and immediately closed upon the latter.

I have discovered that one of the most important reasons of failure to successfully make high quality wire glass by the prior art single-pour processes was due to the use of such methods and apparatus as resulted in re-rolling and re-distributing the constituent parts of the sheet, either during the placing of the wire mesh therein or during the healing or smoothing out rolling, and usually during both of these operations. A prime reason for failures of success heretofore has been, I think, due to the failure to take into account the fact that as soon as the pour of glass is dumped upon the table, and especially when it has been spread out across the table, the bed expands as to its upper surface, under the influence of the heat, and assumes a distinctly crowning shape in transverse section. This crowning of the table commences, of course, as soon as the glass is dumped, but increases very materially and continuously during the entire progress of the formation of the sheet. If a straight cylindric roll be used, as it always has been in the prior art, to spread the sheet, it will, of course, make the sheet thinner at the middle than at the edges to the extent that the periphery of the roll and bed of the table have been thrown out of parallelism by the expansive effect described, but inasmuch as the leading roll passes over the bed of the table as fast as the ball of glass advances and almost immediately after the pour of glass encounters the table, it follows that the crowning of the table beneath said leading roll is comparatively slight. However, from the instant the ball of glass is spread into contact with the surface of the bed that part of the bed commences to expand and crown, and by the time the following roll passes over any given part of the sheet the table has crowned sufficiently so that if the second roll be a smooth roll and straight it will re-roll and re-form the sheet, making it substantially thinner at the middle than at the edges. The surplus glass in the central portion of the sheet commences to accumulate in advance of the second roll, and this accumulation increases as the roll progresses, so that almost immediately there is a sufficient accumulation ahead of the following roll to effect a disastrous circulating movement of the glass and more or less of a re-distribution and re-rolling of the same. In carrying into effect the present invention, I so shape and form the rolls that this re-rolling and torturing effect upon the sheet is obviated. That is to say, describing a preferred apparatus, I make the leading roll 2 slightly concave in axial section, and I make the embedding and forming rolls also concave, preferably increasingly so, so that the curvature in longitudinal section of the periphery of each roll compensates for the crowning of the bed under the casting operation, and a sheet of glass is produced of substantially uniform thickness throughout, and, what is more important, all those rolls which follow the leading or spreading roll act upon the sheet of glass without substantially displacing or re-shaping its structure.

The second roll 5 is, in the apparatus shown, the embedding roll, and I make the disks 6, the peripheries of which constitute the embedding flanges, of succeedingly smaller diameter from each end toward the center of the roll, and also make the peripheries of said disks of peculiar quality, of peculiar shape in cross section, and of such dimensions and so spaced apart as to bear a definite or approximately definite relation to the thickness of sheet to be formed. Describing said embedding roll more specifically, its ends are supported to roll upon the tracks 4, the diameter of the rolling portion being such as to bring the edges or extreme peripheries of the embedding disks 6 to within a distance from the surface of the table equal to about one-half of the thickness of the sheet of glass. As shown more particularly in Figs. 5 and 6, the several disks 6 are mounted upon a roll proper 7 and spaced apart at regular distances by means of removable collars 8. The disks are either formed of some dense or fine grained metal, such as steel or fine iron, or else, if formed of coarser metal, are plated with nickel or other suitable metal which will form a smooth dense surface upon the acting edges of the disks. Furthermore, in the preferred construction shown the edges of these disks are beveled practically all at one side, as indicated at 9, while the opposed side 10 is perpendicular to the axis of the roll; the edge proper 11 being moderately sharp but still sufficiently rounded so as to not disfigure the wire. It is important that the radial depth of these flanges be ample to permit them to cut through the top half of the sheet without pushing the molten metal ahead of the roll wave-fashion. That is to say, there must be ample space between the flanges to allow the glass, which is necessarily displaced to some extent by the entrance of the wedge-shaped flanges therein, to simply rise and then flow back as the embedding roll passes on, without any considerable forward movement. Obviously the thinner the flanges are the better so far as this particular object is concerned, but it must be taken into account that the flanges must have such thickness that they will not be overheated during their passage through the glass, because the instant the metal becomes overheated the glass sticks to it, and this would, of course, result in the sheet being drawn up wave-fashion in rear of the embedding roll and produce one of the very effects which it is important to avoid. The object of making the bevel all at one side, instead of partly upon each side, is to facilitate the closing up of the cuts formed in the glass by these flanges. I have found that with a cut or kerf produced by a flange of this shape the gash closes up progressively from the bottom or deepest part of the cut upwardly, and without entrapping gas, whereas if the bevel be partly on each side and the total wedge width or sharpness of inclination of the flange be the same, there is a greater tendency of the sides of the gash to flow together at or near the surface of the plate before the bottom of the cut is closed, thus entrapping the gas, which is immediately expanded by the heat of the glass into bubbles, which remain in the finished sheet.

In practice I have found that for rolling quarter inch glass the flanges should be not less than one-fourth inch in radial depth, should be spaced about five-eighths inch apart, and the thickness at the base of the bevel should be not greater than one-half inch. In order to make half inch glass, however, such as is generally used for polishing, the disks or embedding flanges should be spaced about one and one-fourth inches apart, and the radial depth is preferably somewhat more than three-eighths inch. The same set of disks may be successfully used for either quarter or half inch glass by simply using a different set of spacing collars 8 for each different thickness of glass. It is to be particularly noted that these disks are made of succeeding smaller diameter from each end of the roll toward the center, so as to produce an embedding roll which, as to its periphery or greatest diameter, is slightly concave in axial section; the concavity being, of course, in the form of a regular curve. From what has heretofore been said it will be obvious that if the disks were not thus made of smaller diameter toward the center, the displacing action would be greatly augmented throughout the central portion of the roll, and, furthermore, the wire mesh instead of being placed equidistant from the surface throughout the full width of the sheet would approach much closer to the bottom surface in the central portions of the sheet than along the edges. Both of these objections are, of course, serious but are effectively obviated by the adoption of the means described.

It is important that the embedding roll should be placed in as close proximity to the leading or spreading roll as it is practicable to place it and still leave room for the wire-controlling devices, by means of which the wire netting is fed beneath this roll. Immediately following the embedding roll, and placed as near thereto as practicable without interference of the rolls, is arranged the healing or smoothing roll 12. This roll is, or may be, substantially like the leading roll 2, except that it is made more concave than the latter, and preferably is made slightly more concave in axial section than the embedding roll. Like the leading roll, it is supported with its periphery above the bed a distance substantially equal to the thickness of the sheet of glass, and it is of great importance that this roll should be so shaped and so adjusted, and so rotated, that there shall be no substantial accumulation of glass in advance of it as it rolls over the scored surface produced by the embedding roll. By forming it of proper concavity, and adjusting it nicely as to height above the table, I find that this roll will close and heal the cuts formed by the embedding roll perfectly, and leave the surface of the glass practically uniform although usually not perfectly smooth. To impart great smoothness and an evenness which is otherwise not secured, I provide one or more comparatively light, smooth riding rollers, as 13, preferably spaced at some distance in rear of the smoothing roll proper 12. These riding rollers rest with their full weight upon the surface of the glass. That is to say, they do not travel upon tracks or collars but ride wholly upon the glass. The peripheries of these rolls are made concave and substantially of the same degree of concavity as the smoothing roll. That is to say, the concavity is such that their peripheries ride with approximately equal pressure throughout the width of the sheet of glass. Of course, in the case of making glass which is to be subsequently polished by grinding the riding rolls may be dispensed with.

Another feature of the apparatus which contributes to the success of the process is to adjust and control the rate of the rotation or onward rolling movement of the several rolls relatively to the surface of the glass, so that their tendency to displace the glass longitudinally by contact with its surface is minimized to the greatest possible degree. If either of these rolls has a peripheral speed greater than the speed at which the bed is passing beneath it, relatively speaking, then the roll tends to draw through the pass too much glass, thus producing a surplus and wave-like effect in rear of the roll, which is disastrous to good results. On the contrary, if the roll be rotating at a peripheral speed which is too slow as compared with the onward movement of the table, it will produce a dragging effect upon the surface of the sheet of glass which will not only make the latter uneven but if present to any considerable extent will show its effect in transverse cracks through the "skin" of the top surface. The effects of improper peripheral speed in the case of the embedding roll, although in some respects different from those of the spreading and finishing rolls, are not less important. In addition to a tendency to displace the glass longitudinally, either forwardly or rearwardly, there is always a tendency to buckle the wire netting in case the embedding roll is rotating too rapidly, or to distort the meshes and stretch them out in case it be rotating too slowly. Accordingly I provide racks 14 along each side of the bed, and upon each of the several rolls provide gears which intermesh with these racks, and I further provide means for adjusting the drive between each roll and the rack so that I may secure the proper peripheral speed with great exactness. I prefer to use a series of gears graded in size for each of the several rolls, substituting one pair for another in adjusting each roll until I get the correct peripheral speed, or very nearly that. To provide for further slight variations or adjustments of the peripheral speed, I make the rack adjustable as to height; its teeth being so shaped that by raising or lowering the rack bodily the pitch line engagement between rack and gears will be changed and the speed accordingly adjusted. In the drawings, 15, 16, 17 and 18 designate the gears of the leading roll, the embedding roll, the healing roll and the riding roll, respectively. The means of adjusting the rack vertically are indicated at 19, consisting of threaded holes in the frame and tap bolts extending through such holes and engaging the under sides of the racks.

Another important feature of the invention resides in providing adequate and reliable means for controlling the feeding in of the wire mesh. To this end the wire is arranged to pass from any suitable source of supply, as for example a table-like chute 20, whereon it is initially laid in suitable lengths, to and through a pair of tension rollers 21, 22, thence past and in peripheral contact with a stretching out roll 23 of special construction, and thence beneath the embedding roll. The rolls 21, 22, have cylindric peripheries and are journaled parallel with each other; the lower roll being mounted in substantially fixed journals 24 and the upper roll having its trunnions 25 confined in forks 26 which are of such depth as to let the periphery of the roll ride with its full weight upon the lower roll. It follows, therefore, that when the wire is passed between these rolls the weight of the upper roll produces a tension upon the wire, and this tension may be increased by placing added weights or springs upon the extended trunnions of the upper roll.

The stretching roll 23 is journaled in fixed journals, as indicated at 27, and its periphery is formed into two oppositely pitched prominent screw-threaded or spirally corrugated portions, as 23′, 23″, each of which covers one-half the length of the roll, so that the two meet at the center of the latter. The wire in being drawn past this stretching roll rotates the latter, and the direction of pitch of the two threaded or corrugated portions is such that the effect with reference to the direction of rotation is to constantly spread the wire and stretch it from edge to edge.

Another novel feature of the apparatus is the provision of a pair of supporting bars 28, 29, mounted parallel with and in advance of the leading roll in such position that they together form a cradle upon which the ladle 30 may be rested, and slid back and forth while pouring. The use of this kind of a support for the ladle enables the workman to pour out the metal gradually and to continue the pouring throughout a substantial part of the rolling operation; the ladle being so manipulated, and slid back and forth repeatedly while pouring, as to distribute and maintain a moderate supply of glass extending across the width of the sheet. There are several advantages incident to this way of pouring, among which may be mentioned that the glass does not cool so rapidly as would be the case were the whole ladleful dumped at once upon the table; the pour may be larger than could be well accommodated by the older method of dumping the entire ladleful at once; the leading roll is not in contact with so large a mass of molten glass at any time and consequently is not heated to the same degree or extent, and the workman is able to perform his work much more accurately and easily than is the case where the workmen must support the ladle during the emptying of the same by sheer strength.

The operation of rolling the glass has been clearly indicated in connection with the foregoing description, but may be briefly recapitulated as follows: The table being in its initial position and the sheet of fabric in place upon the chute and inserted in the controlling devices, the workmen bring the ladleful of glass and start the pour just in front of the leading roll. The table is now started, and as the leading end of the sheet of glass approaches the embedding roll the workman starts the wire netting down to meet the surface of the sheet, and the sheet and netting pass together beneath the embedding roll, the latter pressing the wire into the glass in the manner hereinbefore described. The continued advance of the table brings the sheet of glass with the mesh embedded therein beneath the smoothing or healing roll, which smooths out the openings or cuts formed by the embedding flanges and the meshes of the wire, and the sheet in passing beneath the riding roll or rolls is further smoothed and made uniform. If the rolls are properly adjusted, the first smoothing or healing roll will completely close the cuts in the upper half of the sheet of glass, so that the subsequent rolls serve only to render somewhat more smooth and uniform the surface. Preferably during the chief part of the rolling out operation, the workmen manipulating the ladle will continue to pour out the glass gradually, thus maintaining a moderate and substantially uniform supply in advance of the leading roll.

It is important that the operation of rolling be performed rapidly, and this is especially important in the case of making so-called thin wire glass, i. e. glass of ¼ inch thickness or thereabout. When rolling half-inch glass, which is the thickness usually employed for polishing, it is, of course, not so important that the rolling operation be rapid, and it may be successfully carried out at a rate of speed not greater than that heretofore commonly employed. It is also important, as hereinbefore pointed out, that the glass be very fluid, i. e. hot, so that the "skin" formed by the leading roll will be extremely tender and the meshes of the wire will readily break through this skin and pass into the body of the glass without substantial distortion of the meshes.

By the foregoing, I do not wish to be understood as implying that it is essential that the rolls follow each other in close succession or that extraordinary speed of manipulation and operation is essential. On the contrary, the possibilities of speed with modern apparatus are such that the apparatus may be so organized as not to take advantage of the highest speed of operation and still carry out my process successfully.

The method herein claimed is not limited to being carried out by the particular apparatus shown in this application.

I claim as my invention:

1. An improved single-pour process of making wire glass, which consists in rolling out a single-thick sheet, concurrently, but in sequence to the spreading of the sheet, pressing into one side thereof a sheet of wire netting and disposing the same approximately mid-thickness of the glass and in substantially undeviating parallelism with the surfaces thereof, progressively pressing the wire inset sheet between a roller and an opposed surface, the acting portions of which pressing devices are maintained substantially in accurate parallelism with each other and at a distance apart substantially the mean thickness of the sheet being acted upon, whereby the side of the sheet opposite that through which the wire is inserted and the wire itself remain practically undisturbed by said pressing operation, and continuing such progressive formation of the sheet until completed.

2. The improvement in the art of making wire glass, which consists in rolling out a single-thick sheet, progressively, but in sequence to the spreading of the sheet, insetting a sheet of wire netting through one side of the sheet and disposing it in a substantially undeviating plane remote from, and parallel with, the surfaces of the sheet, concurrently and progressively pressing the wire inset sheet between forming surfaces accurately parallel with each other, spaced and maintained apart a distance just equal to the mean thickness of the pre-formed sheet and thereby restoring the integrity of that side of the sheet through which the wire is inset, and continuing the operation progressively until the sheet is formed.

3. An improved single-pour process of making wire glass, consisting in spreading a sheet of molten glass on a normally flat surface, progressively, but in sequence to the spreading of the sheet, pressing a sheet of wire netting into one side of the sheet and placing it in substantially undeviating parallelism with the top and bottom surfaces of the sheet, and as the insetting of the wire proceeds pressing the wire inset sheet between progressively-acting forming surfaces whose acting portions are, during the moment of pressing contact with the sheet, maintained accurately parallel despite the distorting action of the heat from the sheet of glass, and the pass between which forming surfaces is during such pressing operation maintained of a width substantially equal to the mean thickness of said preformed sheet, whereby the integrity of the latter is restored without substantially disturbing or redistributing the glass of the lower half of the sheet and without substantially disturbing the inset wire netting, and continuing such forming and wire insetting process progressively until the sheet is completed.

CLEMENT J. JUNGERS.

Witnesses:
ALBERT H. GRAVES,
EMILIE ROSE.